United States Patent [19]

Preusch et al.

[11] Patent Number: 4,587,027

[45] Date of Patent: May 6, 1986

[54] ANTIFREEZE FOR POTABLE WATER

[75] Inventors: Robert W. Preusch; Thomas F. O'Farrell; Ollie O'Neal, Jr., all of Chicago, Ill.

[73] Assignee: United States Movidyn Corporation, Chicago, Ill.

[21] Appl. No.: 648,009

[22] Filed: Sep. 16, 1984

[51] Int. Cl.$^4$ .............................................. C09K 5/00
[52] U.S. Cl. ...................................... 252/73; 252/70
[58] Field of Search ......................................... 252/73

Primary Examiner—Paul Lieberman
Assistant Examiner—Robert A. Wax
Attorney, Agent, or Firm—Cook, Wetzel & Egan, Ltd.

[57] ABSTRACT

Potable (drinking) water systems of recreational vehicles, boats, vacation homes, and the like, need to be protected against freezing during periods of non-use during the cold winter season. Typical propylene glycol antifreeze additives are effective but expensive. It has been found that use of an inhibitor solution based on food-grade corn syrup effectively boosts the effectiveness of propylene glycol so that as little as 19% plus or minus 0.25% by liquid volume is optimally used together with about 10% of a food-grade corn syrup in an anti-freeze solution for −50% protection. This is a more economical and effective system than previously known in commercialized systems heretofore maintained as trade secrets by the inventors and the assignee.

2 Claims, No Drawings

ANTIFREEZE FOR POTABLE WATER

The present invention relates to antifreeze systems for closed liquid systems, and particularly to antifreeze solutions for potable water systems in recreational vehicles, boats, cabins, and the like.

Previously to development of the present invention, water systems exposed to sub-freezing temperatures have been protected by addition of propylene glycol solutions to reduce the freezing and/or solid expansion point of the resulting liquid mixture below the lowest extreme of ambient temperature expected. Propylene glycol howver is expensive compared to other available additives. Salt is a cheap available additive, but it corrodes metal pipes and fittings with which it comes into contact. No corrosion inhibitor compatible with potable water systems is known. Corn syrup is a readily available, inexpensive material and is easily processed. Corn syrup has been found to boost the effectiveness of propylene glycol so that substantially less of it is required for winterizing closed, potable water systems. While the assignee sold a 10% syrup, 20.00% propylene glycol solution more than a year before the filing date of this patent, it has since been found that an optimum solution for antifreeze protection requires even less propylene glycol.

By way of summary, the present invention requires a mixture of food-grade corn syrup and food-grade propylene glycol in a ratio of 10% by volume corn syrup to 19% plus or minus 0.25% by volume propylene glycol. The balance of the antifreeze solution comprises water together with small amounts of a coloring dye and preservative. This mixture protects water systems down to 50° Fahrenheit below zero. A solution of about 7.7% by volume corn syrup and 29.125% plus or minus 0.25% propylene glycol is effective for freezing and expansion protection down to 60° Fahrenheit below zero.

In accordance with the invention, a solution for winterizing closed, potable water systems comprises a mixture of corn syrup and propylene glycol in certain liquid volume percentages. For a liquid solution which withstands freezing and dangerous expansion to temperatures of 50° Fahrenheit below zero, an inhibitor solution comprising 70.941% of food grade corn syrup, 29.047% water, 0.007% food grade coloring dye and 0.005% preservative such as formaldyhede is prepared. A solution of 14.12% by liquid volume of this inhibitor solution is mixed with 19.00% plus or minus 0.25% of food-grade propylene glycol and about 70% water.

A second antifreeze solution for winterizing closed, potable water systems protects the system against freezing and dangerous expansion to temperatures of 60° Fahrenheit below zero. This solution comprises 12.35% by liquid volume of the above inhibitor solution combined with 29.125% plus or minus 0.25% of food grade propylene glycol, and the balance is water. The minus 60% Fahrenheit antifreeze is conveniently prepared form a mixture of 87.5% of the minus 50° Fahrenheit formula with an added 12.5% propylene glycol.

The antifreeze solutions of the present invention are conveniently used as described, without further dilution. The clean water tanks of a vehicle, boat, or other structure are drained through the faucets and other outlets. Then a sufficient quantity of the antifreeze solution is emptied into the clean water tank and is pumped or otherwise forced through the system until the water at each outlet turns the color of the dye provided with the antifreeze solution. The solution is separately added to various traps and drains and, through toilets, to the waste holding system. Water heaters and other devices are separately drained or are filled with antifreeze solution.

While the invention has been disclosed in a ready to use, full strength form, it can also be conveniently prepared and used as a concentrate. Such a concentrate can be added to systems having substantial, non-drainable water volumes, and is conveniently stored. The appended claims are directed to the non-concentrated form of the invention, either as supplied or as reconstituted by the user, before being diluted by any residual water in a water system.

We claim as our invention:

1. A liquid solution, for use in potable water systems, which substantially withstands freezing and damaging expansion to temperatures of 50° Fahrenheit below zero (minus 45° C.), comprising 14.12% by liquid volume of an inhibitor solution comprising about 70.941% food-grade corn syrup, 29.047% water, 0.007% food-grade coloring dye, and 0.005% preservative; 19.00% plus or minus 0.25% food-grade propylene glycol; and the balance water.

2. A liquid solution, for use in potable water systems, which substantially withstands freezing and damaging expansion to temperatures of 60° Fahrenheit below zero (minus 51° C.), comprising 12.35% by liquid volume of an inhibitor solution comprising about 70.941% food-grade corn syrup, 29.047% water, 0.007% food-grade coloring dye, and 0.005% formaldehyde as a preservative; 29.125% plus or minus 0.25% food-grade propylene glycol; and the balance water.

* * * * *